United States Patent [19]

Tanaka et al.

[11] 3,920,520

[45] Nov. 18, 1975

[54] FERMENTATION PROCESS FOR PRODUCING OPTICALLY ACTIVE L-LYSINE

[75] Inventors: Tutomu Tanaka; Tamotsu Hirakawa; Kenji Takahara, all of Hyogo, Japan

[73] Assignee: Kanegafuchi Chemical Industries Co., Ltd., Osaka, Japan

[22] Filed: Aug. 7, 1974

[21] Appl. No.: 495,474

[30] Foreign Application Priority Data
Aug. 7, 1973 Japan.............................. 48-89135

[52] U.S. Cl................... 195/30; 195/49; 195/28 R
[51] Int. Cl.².......................................... C12D 13/06
[58] Field of Search...................... 195/28 R, 30, 49

[56] References Cited
UNITED STATES PATENTS
3,707,441   12/1972   Shiio et al........................ 195/28 R Primary Examiner—Alvin E. Tanenholtz
Attorney, Agent, or Firm—Sughrue, Rothwell, Mion, Zinn & Macpeak

[57] ABSTRACT

A fermentation process for producing L-lysine which comprises aerobically cultivating an L-lysine producing mutant strain of a microorganism belonging to the Genus Acinetobacter in a culture medium containing a carbon source assimilable by the microorganism until a substantial amount of L-lysine is accumulated in the culture medium and recovering the thus accumulated L-lysine from the culture medium.

15 Claims, No Drawings

FERMENTATION PROCESS FOR PRODUCING OPTICALLY ACTIVE L-LYSINE

BACKGROUND OF THE INVENTION

1. Field of the Invention

This invention relates to a fermentation process for producing L-lysine. More particularly, this invention relates to a fermentation process for producing L-lysine which comprises aerobically cultivating an L-lysine producing mutant strain of a microorganism belonging to the Genus Acinetobacter in a culture medium containing a carbon source assimilable by the microorganism until a substantial amount of L-lysine is accumulated in the culture medium and recovering the thus accumulated L-lysine from the culture medium.

2. Description of the Prior Art

It is well known that L-lysine is an important additive for feedstuffs and foodstuffs and raw material for various pharmaceuticals. Recently, the need for producing L-lysine economically by fermentation on an industrial scale from an assimilable carbon source which is easily available at low cost has steadily increased.

Various processes for producing L-lysine by fermentation are known. Processes using hydrocarbons as assimilable carbon sources are disclosed, for example, in Japanese Patent Publication Nos. 875/1965, 14789/1969, 25711/1972, 43073/1972, etc. The L-lysine producing strains used in the above well known processes are those belonging to either of Genera Corynebacterium, Brevibacterium, Arthrobacter, Micrococcus, mycobacterium or Nocardia. It has been previously unknown that the species or mutant strains belonging to Genus Acinetobacter have an ability to produce L-lysine in high yield which can be utilized in the production of L-lysine on an industrial scale.

SUMMARY OF THE INVENTION

A primary object of this invention is therefore to provide a fermentation process for producing L-lysine from hydrocarbons as a carbon source, which comprises cultivating an L-lysine producing mutant strain of a microorganism belonging to the Genus Acinetobacter.

Another object of this invention is to provide a process for fermentation for producing L-lysine in high yield from hydrocarbons as a carbon source on an industrial scale.

DETAILED DESCRIPTION OF THE INVENTION

A number of hydrocarbon-assimilable microorganisms were isolated from soils for screening species which would produce L-lysine from hydrocarbons in high yield, and unexpectedly it was found that some mutant strains of a microorganism belonging to the Genus Acinetobacter have an ability to produce L-lysine in high yield from hydrocarbons.

A typical example of the microorganism belonging to the Genus Acinetobacter is a novel species No. 38 (American Type Culture Collection Accession Number ATCC 31023). This strain was found to produce only a small amount of L-lysine in a culture medium containing n-paraffins, but it was found that various mutant strains having an improved L-lysine producing ability can be obtained from the above species when this species is subjected to a mutational treatment such as ultraviolet ray radiation or a treatment with mutagenic agents such as nitrosoguanidine, nitrogen mustard and the like according to the well-established mutant-producing technique. These mutant strains were designated as No. 38-15 (ATCC 31024), No. 38-19 (ATCC 31025) and No. 38-20 (ATCC 31038). The present invention is based on the above finding and production of L-lysine can be advantageously conducted on an industrial scale using one of the above mutant strains.

The microbiological properties of Acinetobacter sp. No. 38 which has been isolated are as follows:

I. Morphological Characteristics:
 1. At logarithmic growth phase: $0.7 - 1.0 \times 1.5 - 2.0$ $\mu$ in size, short rods having round edges at both ends, single or twin cells. At stationary phase: slightly smaller size than those at the logarithmic growth phase and some spherical cells observed, single or twin cells. On continuing cultivation, large size spherical cells appear.
 2. Movement: None
 3. Gram-Stain (Fucker's Modified Method): Negative, discoloration with 95% ethyl alcohol sometimes difficult
 4. Spore Formation: None
 5. Acid-Fast Stain: Negative II. Cultural Characteristics:
 1. Nutrient Agar Plate:
  Grown in round colonies. Complete edge. Grayish white. Gloss and smooth surface. No pigment production.
 2. Nutrient Agar Slant:
  Grown in linear colonies. Grayish white. Gloss and smooth surface. No pigment production.
 3. Nutrient Broth:
  Uniformul turbid. Precipitate formed.
 4. Nutrient Gelatin Stick Culture:
  No liquefaction. Production of small amount of brown soluble pigment. Grown on surface.
 5. Litmus Milk:
  Acidic and coagulation III. Physiological Characteristics:
 1. Nitrate Reduction: Negative
 2. V.P. Reaction Negative
 3. Indole Production Negative
 4. Hydrogen Sulfide Formation: Negative to slighly positive
 5. Starch Hydrolysis: Negative
 6. Citric Acid Utilization: Positive
 7. Urease: Positive
 8. Catalase: Positive
 9. Oxidase Negative
 10. Acid Formation from Carbohydrates:
  Acid formation from xylose, glucose, mannose and galactose. Acid formation from lactose after a lapse of time. Weak acid formation from arabinose and fructose. No acid formation from maltose, sucrose, trehalose, sorbitol, innositol, glycerin and starch.
 11. utilization of Carbon Sources:
  Positive utilization of $C_{10}$–$C_{20}$ n-paraffins, acetic acid, citric acid, succinic acid and ethanol.
 12. Nutrient Requirement: None
 13. O.F. Test: Oxidative
 14. Optimum Growth Temperature: 30° to 60°C
 15. Growable pH Value: 5.5 to 9.0
 16. Aerobicity: Aerobic IV. Source of Isolation: Soil From the above characteristics, except for the production of a small amount of brown pigment in Nutrient gelatin medium, without a doubt the species described herein belongs to the Genus Acinetobacter referring to the criteria given in P. Baumann et al, *Journal of Bacteriology*, p1520, 1968, but there is no identical species in the Genus Acinetobacter. Therefore, this species has been designated Acinetobacter sp. No. 38.

As is described previously, the present invention utilizes L-lysine producing mutant strains of Acinetobacter sp. No. 38. Such mutant strains can be obtained by conventional procedures which are well known in the art.

A typical procedure for the formation of mutant strains is described hereinafter in greater detail but other procedures can also be used for producing mutant strains from Acinetobacter sp. No. 38. That is, the mutant strains having an excellent ability to produce L-lysine can be derived from the parent species by a mutagenic treatment or an adaptation using at least one of amino acids or amino analogues. More specifically, a culture of Acinetobacter sp. No. 38 can be treated with a mutagenic agent such as nitrosoguanidine (N-methyl-N'-nitro-N-nitrosoguanidine) or nitrogen mustard or treated with ultraviolet irradiation, or can be subjected to an adaptation. The adaptation can be conducted by culturing the parent species in a culture medium containing a specific amino acid or amino acid analogue or a combination thereof, for example, amino acids such as threonine, valine, methionine, lysine, serine and the like, amino acid analogues such as norvaline β-hydroxy-norvaline, α-aminobutyric acid, α-amino-β-chlorobutyric acid, S-aminoethylcysteine, lysine hydroxide, serine hydroxide, methionine hydroxide, valine hydroxide and the like, advantageously at a concentration higher than about 0.5 g of the amino acids or amino acid analogues or a combination thereof per 1 liter of the culture medium. The mutant strain can then be obtained by diluting the resulting culture appropriately and spreading the diluted on a minimum agar plate containing the same amino acids or acid analogues or the same combination thereof as used above and culturing the strain for 3 to 5 days to harvest the resulting colonies. Examples of the carbon source which can be used for the minimum agar medium are n-paraffins, organic acids, ethanol and the like.

After the strain is made resistant to the specific amino acid or the amino acid analogue used in the adaptation, the resulting resistant strain is further subjected to a mutagenic treatment or an adaptation using other amino acids or amino acid analogues or a combination thereof to make the strain resistant to the amino acids or the amino acid analogues or the combination thereof used.

The strain thus obtained is repeatedly subjected to the above treatment using a different amino acid or amino acid analogue or a combination thereof to obtain a strain which is resistant to various amino acids or amino acid analogues or a combination thereof.

The resulting resistant strain has an excellent ability to produce L-lysine in the aerobic cultivation using n-paraffins.

Carbon sources which can be used in the culture medium for the production of L-lysine can be any type of assimilable carbon sources. In accordance with the process of this invention, L-lysine can be produced in high yield using petroleum product containing straight chain aliphatic hydrocarbons such as n-paraffins containing 10 to 20 carbon atoms, kerosine, gas oil or the like, as well as alcohols, organic acids and the like. These carbon sources can be used individually or as a combination of two or more carbon sources. A particularly satisfactory result can be obtained by supplying the above carbon sources during the cultivation to the culture medium.

Nitrogen sources which can be used in the culture medium include organic or inorganic ammonium salts such as ammonium sulfate, ammonium chloride, ammonium nitrate, ammonium acetate, ammonium succinate, urea, ammonia and the like.

Inorganic salts which can be used in the present invention include potassium phosphate, sodium phosphate, magnesium sulfate, calcium carbonate, ferrous sulfate, manganese sulfate, zinc sulfate and the like. These inorganic salts can be used in an amount commonly employed in conventional fermentation processes.

Further, the addition of surface active agents often advantageously affects the fermentation. For example, polyoxyethylene sorbitan trioleate (Tween 85, tradename produced by Atlas Powder Co., U.S.A.) can be effectively used in the culture medium in an amount of approximately 0.01 to 0.5% by weight based on the total amount of the culture medium.

The pH of the culture medium is maintained in the range of about 5.5 to 9.0, preferably about 6.0 to 8.0 during the entire cultivation period. The pH can preferably be maintained at the above value by adding ammonium ions. The cultivation is carried out at a temperature of about 25° to 40°C, preferably from 30° to 37°C. It is necessary that the cultivation be conducted under aerobic conditions, for example, by stirring with aeration or by shake-culturing. Upon completion of the cultivation, the resulting microbial cells can be removed from the culture broth using well-known techniques such as filtration or centrifuging. In a preferred embodiment, the desired L-lysine can be separated from the thus obtained filtrate or the supernatant in accordance with well-known procedures using an ion-exchange resin such as Amberlite IRC-84, IRC-120, IRC-50 and the like. The ion-exchange resin is then eluted with aqueous ammonia and the resulting eluate is concentrated and neutralized with concentrated hydrochloric acid. The resulting L-lysine hydrochloride can be then dried to give a product having a purity higher than 98%.

The present invention is further illustrated by the following examples, but they are not to be construed as limiting the scope of this invention. All percents, parts, ratios and the like are by weight unless otherwise indicated.

EXAMPLE 1

A platinum loopful amount of each inoculum of Acinetobacter sp. No. 38 (ATCC 31023 ) and the mutant strains derived from this parent strain, i.e., Acinetobacter sp. No. 38-15 (ATCC 31024), Acinetobacter sp. No. 38-19 (ATCC 31025) and Acinetobacter sp. No. 38-20 (ATCC 31038) was inoculated into a large size test tube containing 10 ml of a culture medium comprising 1% peptone, 1% meat extract and 0.5% yeast extract. The culture medium had previously been sterilized at 120°C for 15 minutes. The inoculated culture was then cultivated for 24 hours at a temperature of 33°C to prepare a seed culture. Two drops of the seed culture thus obtained were then inoculated into 10 ml of each of the following culture media contained in a large size test tube, and the inoculated culture was cultivated at a temperature of 33°C.

i. Culture Medium (Control)

| | |
|---|---|
| Ethanol | 15 ml (added after sterilization) |
| 75% Phosphoric Acid | 12 ml |
| Ammonium Sulfate | 6 g |
| $MgSO_4 \cdot 7H_2O$ | 200 mg |
| $FeSO_4 \cdot 7H_2O$ | 100 mg |
| $CaCl_2 \cdot 2H_2O$ | 100 mg |
| $ZnSO_4 \cdot 7H_2O$ | 30 mg |
| $MnSO_4 \cdot 4H_2O$ | 2 mg |
| $CuSO_4 \cdot 5H_2O$ | 0.5 mg |
| NaOH | 10 g |
| Tap Water | 1 l | ii. Threonine-Containing Medium
Control medium plus 0.5 g/l of threonine iii. Valine-Containing Medium
Control medium plus 0.5 g/l of valine

The culture media were sterilized at 120°C for 15 minutes prior to the inoculation. The growth of the strains in each of the culture media was as follows:

| Cultivation Time (hrs.) | Medium | Strain No. 38 | No. 38-15 | No. 38-19 | No. 38-20 |
|---|---|---|---|---|---|
| 20 | Control | + | + | + | + |
|  | Control + Threonine | − | + | − | − |
|  | Control + Valine | − | + | + | + |
| 48 | Control + Threonine | + | + | + | + |
|  | Control + Valine | − | + | + | + |

The above results indicate that, at 20 hours' cultivation, strain No. 38-15 is resistant to threonine and valine, and strains No. 38-19 and No. 38-20 are resistant to valine.

Each of the above 4 strains was inoculated into an n-paraffin inorganic salt slant medium having the following composition at a temperature of 33°C for 2 days.

Composition of n-Paraffin Inorganic Salt Slant Medium

| | |
|---|---|
| n-Paraffin ($C_{13}$—$C_{18}$) | 0.8% |
| Ammonium Sulfate | 0.6% |
| $K_2HPO_4$ | 1.0% |
| $KH_2PO_4$ | 1.0% |
| $MgSO_4 \cdot 7H_2O$ | 0.02% |
| NaCl | 0.1% |
| $FeSO_4 \cdot 7H_2O$ | 0.01% |
| $CaCl_2 \cdot 2H_2O$ | 0.01% |
| $ZnSO_4 \cdot 7H_2O$ | 0.003% |
| $MnSO_4 \cdot 4H_2O$ | 0.0003% |
| Agar | 2% |
| (pH, 7.0; sterilized at 120°C for 15 minutes) | |

A platinum loopful amount of the resulting culture was then inoculated into 20 ml of the following L-lysine producing medium contained in a 500 ml Sakaguchi flask followed by cultivation with shaking at a temperature of 33°C for 10 days.

L-Lysine Producing Medium

| | |
|---|---|
| n-Paraffin ($C_{12}$ — $C_{18}$) | 10% |
| $K_2HPO_4$ | 0.05% |
| $KH_2PO_4$ | 0.05% |
| $MgSO_4 \cdot 7H_2O$ | 0.05% |
| $FeSO_4 \cdot 7H_2O$ | 0.001% |
| $ZnSO_4 \cdot 7H_2O$ | 0.001% |
| $MnSO_4 \cdot 4H_2O$ | 0.001% |
| Tween 85 | 0.1% |
| $CaCO_3$ | 3% |
| $(NH_4)_2SO_4$ | 3.5% |
| (sterilized) at 120°C for 15 minutes) | |

Upon completion of the cultivation, the resulting L-lysine hydrochloride in the broth was measured using a microbioassay method to obtain the following results:

| Strain Used | Amount of L-Lysine HCl |
|---|---|
| Acinetobacter sp. No. 38 | 0.4 g/l |
| Acinetobacter sp. No. 38–15 | 20.2 g/l |
| Acinetobacter sp. No. 38–19 | 21.4 g/l |
| Acinetobacter sp. No. 38–20 | 1.1 g/l |

EXAMPLE 2

A strain of Acinetobacter sp. No. 38-15 was precultured with shaking in an n-paraffin inorganic salt slant as described in Example 1 for 2 days at a temperature of 33°C. A loopful amount of the resulting culture was then inoculated into 30 ml of the following n-paraffin seed culture medium contained in a 500 ml Sakaguchi flask and cultivated at a temperature of 33°C for 1 day.

Seed Culture Medium

| | |
|---|---|
| n-Paraffin ($C_{12}$ — $C_{18}$) | 2% |
| 75% Phosphoric Acid | 1.2% by volume |
| $(NH_4)_2SO_4$ | 0.6% |
| NaCl | 0.1% |
| $MgSO_4 \cdot 7H_2O$ | 0.02% |
| $CaCl_2 \cdot 2H_2O$ | 0.01% |
| $FeSO_4 \cdot 7H_2O$ | 0.01% |
| $ZnSO_4 \cdot 7H_2O$ | 0.003% |
| $MnSO_4 \cdot 4H_2O$ | 0.0002% |
| Tween 85 | 0.05% |
| KOH | 1.4% |
| (sterilized at 120°C for 15 minutes) | |

5 Ml of the resulting seed culture was then transferred into 200 ml of a seed culture medium having the same composition as described above contained in a 2 l Sakaguchi flask and shake-cultured at a temperature of 33°C for 1 day. 600 ml of the resulting seed culture was then inoculated into 19 l of the following L-lysine producing culture medium contained in a 30 l jar fermentor and shake-cultured at a temperature of 33°C while aerating at a rate of 27 l/min., stirring at 500 rpm and maintaining the pH of the culture medium at 6 to 8 with aqueous ammonia for a period of 72 hours.

L-Lysine Producing Medium

| | |
|---|---|
| n-Paraffin ($C_{12}$ — $C_{18}$) | 10% |
| $K_2HPO_4$ | 0.05% |
| $KH_2PO_4$ | 0.05% |
| $MgSO_4 \cdot 7H_2O$ | 0.05% |
| $FeSO_4 \cdot 7H_2O$ | 0.001% |
| $ZnSO_4 \cdot 7H_2O$ | 0.001% |
| $MnSO_4 \cdot 4H_2O$ | 0.001% |
| Tween 85 | 0.1% |
| $(NH_4)_2SO_4$ | 2.0% |
| $CaCO_3$ | 1.0% |

-continued

L-Lysine Producing Medium (sterilized at 120°C for 15 minutes)

The amount of L-lysine produced was found to be 22 g as L-lysine hydrochloride per 1 liter of the culture broth. Two liters of the resulting culture broth was then centrifuged to remove microbial cells, and the supernatant was passed through a column of an ion-exchange resin Amberlite IRC-84 whereby L-lysine was adsorbed on the resin. The column was washed with water, and L-lysine was eluted with dilute aqueous ammonia. The eluate was then concentrated and adjusted to a pH of 5.5 with concentrated hydrochloric acid followed by drying to give 37.9 g of L-lysine hydrochloride having a purity higher than 98 %.

EXAMPLE 3

A platinum loopful amount of a Bouillon slant culture of Acinetobacter sp. No. 38-15 which had been cultured at a temperature of 33°C for 2 days was used to inoculate 20 ml of an L-lysine producing culture medium contained in a 500 ml Sakaguchi flask. The inoculated strain was then shake-cultured at a temperature of 33°C for 4 days. The medium used in this example contained ethanol as a carbon source and had the following composition:

| | |
|---|---|
| Ethanol (fed incrementally) | 5% |
| $K_2HPO_4$ | 0.1% |
| $KH_2PO_4$ | 0.1% |
| $MgSO_4.7H_2O$ | 0.05% |
| $FeSO_4.7H_2O$ | 0.001% |
| $ZnSO_4.7H_2O$ | 0.001% |
| $MnSO_4.4H_2O$ | 0.001% |
| Tween 85 | 0.1% |
| $CaCO_3$ | 1% |
| $(NH_4)_2SO_4$ | 1% |
| (sterilized at 120°C for 15 minutes) | |

Upon completion of the cultivation, the resulting culture broth was found to contain 4.1 g of L-lysine per 1 liter of the culture broth.

EXAMPLE 4

A strain of Acinetobacter sp. No. 38-15 was cultivated in a similar manner as described in Example 3 but using acetic acid as a carbon source in the L-lysine producing medium in place of ethanol. Upon completion of the cultivation, the amount of L-lysine was measured using a microbioassay method and the yield of L-lysine hydrochloride was found to be 3.7 g per 1 liter of the culture broth.

While the invention has been described in detail and in terms of preferred embodiments thereof, it is apparent that various changes and modifications can be made therein without departing from the spirit and scope thereof.

What is claimed is:

1. A fermentation process for producing L-lysine which comprises aerobically cultivating an L-lysine producing mutant strain of a microorganism belonging to the Genus Acinetobacter in a culture medium containing a carbon source assimilable by said microorganism until a substantial amount of L-lysine is accumulated in the culture medium and recovering the thus accumulated L-lysine from the culture medium.

2. The process according to claim 1, wherein said assimilable carbon source is a petroleum product containing straight chain aliphatic hydrocarbons.

3. The process according to claim 2, wherein said petroleum product is kerosene, a mixture of n-paraffins containing 10 to 25 carbon atoms or a gas oil containing straight chain aliphatic hydrocarbons having 10 to 25 carbon atoms.

4. The process according to claim 1, wherein said assimilable carbon source is an alcohol.

5. The process according to claim 4, wherein said alcohol is ethanol.

6. The process according to claim 1, wherein said assimilable carbon source is an organic carboxylic acid.

7. The process according to claim 6, wherein said assimilable organic acid is acetic acid.

8. The process according to claim 1, wherein said microorganism is a mutant strain of Acinetobacter sp. No. 38 ATCC 31023.

9. The process according to claim 8, wherein said mutant strain is resitant to an amino acid or its analogue, to a combination of amino acids, to a combination of amino acid analogues or to a combination of amino acids and their analogues.

10. The process according to claim 9, wherein said mutant strain is resistant to more than 0.05% of L-threonine and L-valine or more than 0.05% of L-valine.

11. The process according to claim 10, wherein said mutant strain is Acinetobacter sp. No. 38-15 ATCC 31024, Acinetobacter sp. No. 38-19 ATCC 31025 or Acinetobacter sp. No. 38-20 ATCC 31038.

12. The process according to claim 1, wherein said cultivating is at a temperature of from about 25° to 40°C and at a pH of from about 5.5 to 9.

13. The process according to claim 12, wherein said pH is maintained by the addition of ammonium ions.

14. The process according to claim 1, wherein said cultivating is in the presence of a surface active agent.

15. The process according to claim 14, wherein said surface active agent is polyoxyethylene sorbitan trioleate.

* * * * *